(12) United States Patent
Chandrashekarappa et al.

(10) Patent No.: US 10,964,110 B2
(45) Date of Patent: Mar. 30, 2021

(54) MANAGED ACTIONS USING AUGMENTED REALITY

(71) Applicant: VMware, Inc., Palo Alto, CA (US)

(72) Inventors: Santhosh Chandrashekarappa, Bangalore (IN); Ashish Maan, Bangalore (IN); Adithya Ravi, Bangalore (IN); Lokeswar Akuthota, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/972,498

(22) Filed: May 7, 2018

(65) Prior Publication Data

US 2019/0340819 A1 Nov. 7, 2019

(51) Int. Cl.
| | | |
|---|---|---|
| *G06T 19/00* | (2011.01) | |
| *G06T 7/70* | (2017.01) | |
| *G06F 3/0484* | (2013.01) | |
| *G06F 8/61* | (2018.01) | |
| *H04L 29/06* | (2006.01) | |

(52) U.S. Cl.
CPC ........ *G06T 19/006* (2013.01); *G06F 3/04842* (2013.01); *G06T 7/70* (2017.01); *G06F 8/61* (2013.01); *H04L 63/08* (2013.01)

(58) Field of Classification Search
CPC ..... G06T 19/006; G06T 7/70; G06F 3/04842; G06F 8/61; H04L 63/08
See application file for complete search history.

(56) References Cited

U.S. PATENT DOCUMENTS

| | | | | |
|---|---|---|---|---|
| 9,791,936 B1* | 10/2017 | Kovach | ................... | G06F 3/017 |
| 2010/0045667 A1* | 2/2010 | Kornmann | ............ | G06F 1/1626 |
| | | | | 345/419 |
| 2010/0164990 A1* | 7/2010 | Van Doorn | .......... | G02B 27/017 |
| | | | | 345/633 |
| 2013/0026220 A1* | 1/2013 | Whelihan | ............ | G06Q 10/087 |
| | | | | 235/375 |
| 2013/0257858 A1* | 10/2013 | Na | .......................... | A63F 13/10 |
| | | | | 345/419 |
| 2014/0063055 A1* | 3/2014 | Osterhout | ............... | G06F 3/005 |
| | | | | 345/633 |
| 2015/0074670 A1* | 3/2015 | Gerganov | ............. | G06F 9/5027 |
| | | | | 718/103 |
| 2015/0074743 A1* | 3/2015 | Ilieva | ..................... | H04L 63/10 |
| | | | | 726/1 |

(Continued)

*Primary Examiner* — Yu Chen
(74) *Attorney, Agent, or Firm* — Thomas Horstemeyer, LLP

(57) ABSTRACT

Disclosed are various examples for performing actions using augmented reality. In some examples, a user interface that includes a field of view is generated. The field of view is currently captured using a camera of a client device. Object data in the field of view is detected. Position data is determined. The position data includes a location of the client device and an orientation vector that indicates a direction the camera of the client device. A request for actions is transmitted to a management service. The request includes the object data and the position data. An action and an identity of a managed object are received from the management service. The user interface is updated to include an identity of a managed object, and a user interface element that when selected causes an action to be performed.

20 Claims, 6 Drawing Sheets

(56) References Cited

U.S. PATENT DOCUMENTS

| | | | |
|---|---|---|---|
| 2015/0109334 A1* | 4/2015 | Park | G06T 11/60 |
| | | | 345/633 |
| 2018/0204385 A1* | 7/2018 | Sarangdhar | G06F 3/011 |
| 2018/0268372 A1* | 9/2018 | Bussiek | G06Q 10/06316 |
| 2019/0108686 A1* | 4/2019 | Spivack | G06F 3/011 |
| 2019/0273737 A1* | 9/2019 | Cai | H04N 21/25 |

* cited by examiner

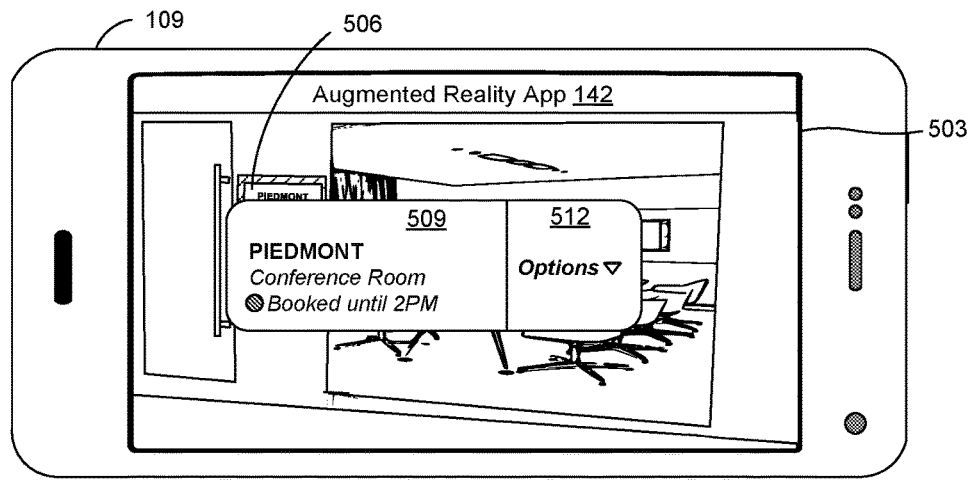
FIG. 5A
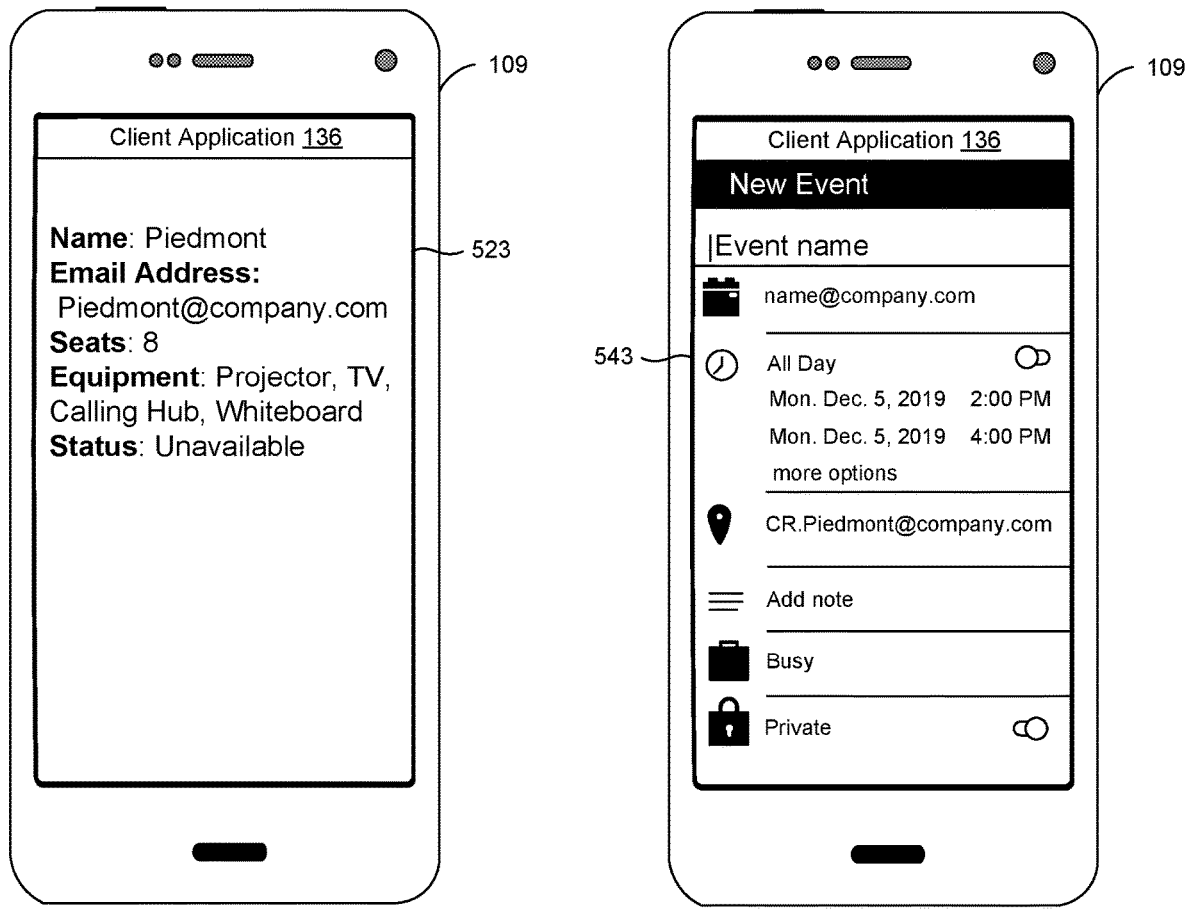
FIG. 5B  FIG. 5C

MANAGED ACTIONS USING AUGMENTED REALITY

BACKGROUND

Appliances, vehicles, sensors, controllers, actuators, and other devices can gather data and interact with the physical world. This network of devices or Internet-of-Things (IoT) can be utilized to improve operations and provide new services. In order to ensure the security and reliability of IoT device connections in an enterprise setting, the enterprise can utilize a management service capable of protecting client devices, IoT devices, as well as email, corporate documents, and other enterprise data from theft, data loss, and unauthorized access. While managed devices are becoming more ubiquitous, controlling and managing their interactions with the physical world can present difficulties.

In order for a user to interact with a managed location, object, or device, a user may need to know or have access to its identity and other information. It can be a security risk to post this information in a public location or in view of all users in an enterprise setting. In addition, it can be inefficient to require users, administrators, or technicians to manually look up and enter this information to allow interactions to take place. Interactions can also require installation of applications, drivers, or other instructions. This can cause delays in time and lost efficiency in the interaction process.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 3A, 3B, 4A-4C, 5A-5C, 6A, and 6B are drawings illustrating functionality implemented by components of the networked environment and rendered for display on a client device.

DETAILED DESCRIPTION

Figure 1:
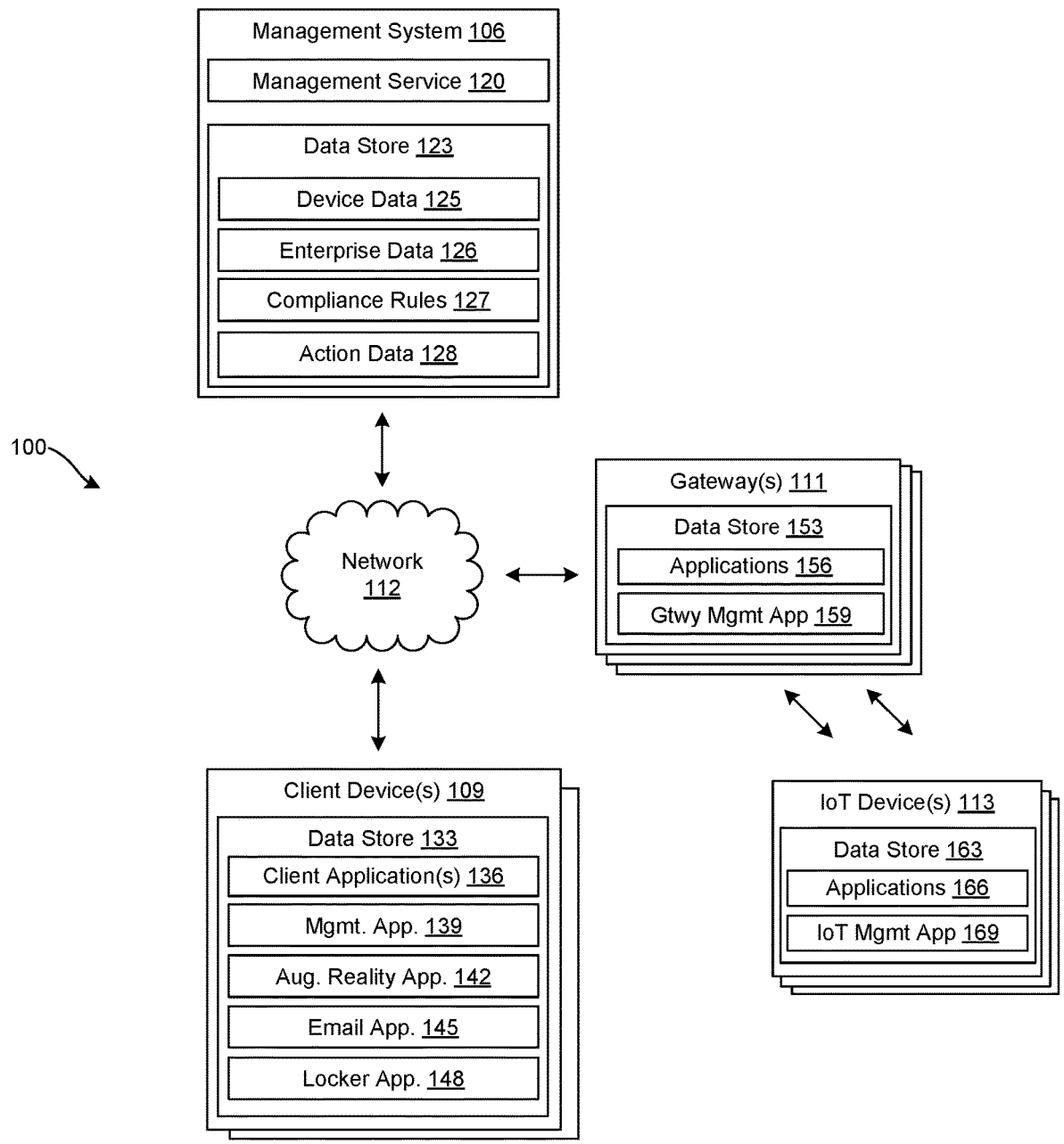
FIG. 1 is a drawing of an example of a networked environment that includes elements involved in managing actions using augmented reality.

The present disclosure relates to enabling managed actions using augmented reality. Controlling and managing interactions with the physical world can present difficulties. For example, in order for a user to interact with a managed location, object, or device, a user may need to know or have access to its identity and other information. It can be a security risk to post this information in a public location or in view of all users in an enterprise setting. In addition, it can be inefficient to require users, administrators, or technicians to manually look up and enter this information to allow interactions to take place. Interactions may also require installation of applications, drivers, or other instructions. This can cause delays in time and lost efficiency in the interaction process. However, the present disclosure describes systems and methods that can improve the efficiency of managed actions using augmented reality.

Augmented Reality (AR) can allow a client device to overlay digital images on top of views of the real world. The present disclosure includes processes that can bring enterprise information into the physical world by enabling actions based on enterprise information and the locations, objects, and devices in the physical environment. The physical world can be digitally interactive with the help of a client device using AR technologies. Information about the physical environment, locations, objects, and devices can be overlaid using the client device. In an enterprise environment, information technology (IT) admins can use a management service to centrally control client devices, gateways, IoT devices, and other managed devices. The devices can include smartphones, tablets, desktop computers, sensors, printers, phones, locks, vending machines, and other devices. The management service can provide commands to the managed devices through a management application or management agent running on the respective devices. An IT administrator can issue the commands using a console provided by the management service. The management service can also include data about managed objects whether the objects include electronic components or not. For example, the management service can store and manage data related to managed objects including managed devices, meeting rooms, fields, other areas and objects in buildings or grounds of the enterprise environment. Certain actions related to these objects can be available and managed using the management service. The management service can include action data that tracks and manages the actions that can be taken in association with the managed objects such as managed devices, rooms, fields, and other areas and objects in the enterprise environment.

In some examples, a user interface that includes a field of view is generated. The field of view is currently captured using a camera of a client device. Object data in the field of view is detected. Position data is determined. The position data includes a location of the client device and an orientation vector that indicates a direction the camera of the client device. A request for actions is transmitted to a management service. The request includes the object data and the position data. In some situations, the request for actions can include authentication data associated with the client device. An action and an identity of a managed object are received from the management service. In some cases, the action can be role-specific based on a role associated with the authentication data within the management service. The user interface is updated to include an identity of a managed object, and a user interface element that when selected causes an action to be performed.

In some examples, once selected, the user interface element can cause the action to be performed by transmitting data identifying the action to the management service, retrieving a command that is placed in a command queue by the management service, and executing the command in the client device. The command can be a command to install at least one of: a driver associated with the managed object, an application associated with the managed object, or a profile associated with the managed object.

Further, an area that includes the managed object within the field of view of the user interface can be determined and the managed object overlay is positioned using the area that includes the managed object. The managed object overlay can intersect with or be contained by the area that includes the managed object.

With reference to FIG. 1, shown is an example of a networked environment 100. The networked environment 100 can include a management system 106, a client device 109, a gateway 111, Internet-of-Things (IoT) devices 113, and other components in communication with one another over a network 112. Internet-of-Things (IoT) devices 113 and other managed devices can connect to the network 112 through the gateway 111. The components of the networked environment 100 can be utilized to enable actions to be performed in association with managed objects in a physical enterprise environment. Managed objects can include managed devices like the client device 109, gateway 111, IoT device 113, as well as rooms, fields, and other managed objects in the enterprise environment.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 106 can include a server computer or any other system providing computing capability. While referred to in the singular, the management system 106 can include a plurality of computing devices that are arranged in one or more server banks, computer banks, or other arrangements. The management system 106 can include a grid computing resource or any other distributed computing arrangement. The management system 106 can be customer or enterprise-specific. In some embodiments, the management system can be part of a local network, and can be local to at least one of the other components of the networked environment, for example, as shown in FIG. 1. In other embodiments, the management system 106 can be remote from the other components, or the computing devices of the management system 106 can be located in a single installation or can be distributed among many different geographical locations local and/or remote from the other components. The management system 106 can also include or be operated as one or more virtualized computer instances. For purposes of convenience, the management system 106 is referred to herein in the singular. Even though the management system 106 is referred to in the singular, it is understood that a plurality of management systems 106 can be employed in the various arrangements as described above.

The components executed on the management system 106 can include a management service 120 as well as other applications, services, processes, systems, engines, or functionality not discussed in detail herein. The management service 120 can be stored in the data store 123 of the management system 106. The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash memory.

The data store 123 can include memory of the management system 106, mass storage resources of the management system 106, or any other storage resources on which data can be stored by the management system 106. The data stored in the data store 123 can include, for example, management data including device data 125, enterprise data 126, compliance rules 127, and action data 128, as well as other data.

The data stored in the data store 123 can be associated with the operation of the various applications and/or functional entities described. Client devices 109, gateways 111, and IoT devices 113 can be identified within the device data 125 by one or more of a device identifier, a unique device identifier (UDID), a media access control (MAC) address, an internet protocol (IP) address, or another identifier that uniquely identifies a device with respect to other devices. The device data 125 can include gateway data associated with gateways 111 and other edge systems or edge devices through which IoT devices 113 can connect to the network 112. The gateway data can also include specifications, and for each gateway 111, a type of gateway or a gateway identifier, and other information. Specifications for the gateway 111 can include hardware configurations including a chipset utilized by the gateway, a performance or capacity, a model identifier, and software configurations, including an agent application installed on the gateway 111. For example, the configuration can identify an agent such as the gateway enrollment agent 118, the gateway management application 159, or a version of the gateway enrollment agent 118 or the gateway management application 159. The gateway data can also include an organizational group.

Device data 125 can include data associated with a configuration of each client device 109, gateway 111, and IoT device 113, and can include an identifier of the client device 109, gateway 111, or IoT device 113. The identifier can be a serial number, media access control (MAC) address, other network address, or another device identifier. In addition, the device data 125 can include an enrollment status indicating whether each client device 109, gateway 111, or IoT device 113 is enrolled with or managed by the management service 120. A client device 109, gateway 111, or IoT device 113 designated as "enrolled" can be permitted to access the enterprise data 126, while a client device 109, gateway 111, or IoT device 113 designated as "not enrolled," or having no designation, can be denied access to the enterprise data 126.

Device data 125 can include credentials associated with user accounts of the management service 120 that enable or permit communications with the management service 120. Similarly, gateway credentials can be credentials associated with gateway accounts and can enable or permit communications with the management service 120. The credentials are provided for authentication with the management service 120 for management and IoT operations. In some situations, gateway credentials are not provided to or exposed to any user during the enrollment process. The credentials can include one or more of a username, a password, an HMAC token, and/or a certificate, for authentication.

Additionally, device data 125 can include indications of the state of devices including the client devices 109, gateways 111, and IoT devices 113. For instance, these indications can specify applications that are installed on the client devices 109, gateways 111, and IoT devices 113, configurations or settings that are applied to each of the devices, user accounts, gateway accounts, or service accounts associated with each of the devices, the physical locations of each of the devices, the network to which each of the devices is connected, and other information describing the current state of each of the devices. While a user account can be associated with a particular person, in some cases a user account can be unassociated with any particular person, and can nevertheless be utilized for client devices 109, gateways 111, or IoT devices 113 that provide certain functionalities, such as automatic functionalities. For example, a gateway 111 can be associated with a service account or a gateway account that is unassociated with any person.

Device data 125 can also include data pertaining to user groups. An administrator can specify one or more of the client devices 109, gateways 111, and IoT devices 113 as belonging to a user group. The user group can refer to a group of user accounts, which can include gateway accounts. User groups can be created by an administrator of the management service 120 such that a batch of client devices 109, gateways 111, and/or IoT devices 113 can be configured according to common settings. For instance, an enterprise can create a user group for the marketing department and the sales department, where client devices 109, gateways 111, and/or IoT devices 113 in the marketing department are configured differently from the client devices 109, gateways 111, and/or IoT devices 113 in the sales department. Device data 125 can include data associated with a gateway account or user account.

Compliance rules 127 can include, for example, configurable criteria that must be satisfied for an enrolled one of the client devices 109, gateways 111, and IoT devices 113 to be in compliance with the management service 120. The compliance rules 127 can be based on a number of factors, including geographical location, activation status, enrollment status, and authentication data including authentication data obtained by a device registration system, time, and date, and network properties, among other factors associated with each device. The compliance rules 127 can also be determined based on a user account associated with a user. In some cases, a gateway 111 can be unassociated with a user, but can nevertheless be associated with a service account, a gateway account, or another user account that is unassociated with a user.

Compliance rules 127 can include predefined constraints that must be met in order for the management service 120, or other applications, to permit access to the enterprise data 126. The management service 120 can communicate with management application 139, gateway management application 159, IoT management application 169, or other applications to determine whether states exist on the client device 109, gateway 111, or IoT device 113, that do not satisfy one or more compliance rules 127. States can include, for example, a virus or malware being detected on the device; installation or execution of a blacklisted application; a device being "rooted" or "jailbroken," where root access is provided to a user of the device. Additional states can include the presence of particular files, questionable device configurations, vulnerable versions of applications, vulnerable states of devices or other vulnerability, as can be appreciated.

The management service 120 can communicate with the gateway 111 to determine whether states exist that do not satisfy one or more compliance rules 127 regarding the gateway 111 and IoT devices 113. The gateway management application 159 can receive IoT device 113 communications, for example from the IoT management application 169. The IoT device 113 communications can include status data for the IoT device 113. The gateway management application 159 can pass or otherwise transmit the status data to the management service 120 for evaluation of the compliance rules 127. The management service 120 can also transmit all or a portion of the compliance rules 127 to the gateway 111. The gateway 111 can store the compliance rules 127 in the data store 123. The gateway 111 can then determine or evaluate whether states exist, for example on the IoT devices 113, that do not satisfy one or more compliance rules 127, for example, without passing or transmitting the status data to the management service 120. In any case, determining that states exist in the IoT device 113 that do not satisfy one or more compliance rules 127 can trigger an action or command that causes the IoT device 113 to be in compliance with the compliance rules 127. In some examples, the compliance rules 127 include one or more commands that bring the IoT device 113 into compliance.

Action data 128 can include actions that can be performed by a client device 109 executing an augmented reality application 142. The action data 128 can include locations of managed objects and managed devices. A managed object can be an object or device associated with an account of the management service 120, or an object for which the management service 120 as a number of actions stored in the action data 128. Each managed object or device can be associated with an object type. The action data 128 can also include actions available for each of the managed objects, and predetermined rules that permit or prohibit which actions are available. Each managed object can be associated with a list or set of actions each action in the list can be permitted or prohibited based on the predetermined rules. For example, available actions for the client device 109 or user of the client device 109 can be identified using an identifier or type of the client device 109, a particular user account, a user group associated with a user account, compliance status of the client device 109 based on compliance rules 127, and/or other information associated with the client device 109. The available actions can be considered role-based actions, and a role can be determined using an identifier or type of the client device 109, a particular user account, a user group associated with a user account, compliance status of the client device 109 based on compliance rules 127, and/or other information associated with the client device 109. Each action in the list of actions for a managed object can be associated with a respective role and/or the predetermined rules.

The management service 120 can oversee the management of devices including the client devices 109, gateways 111, and IoT devices 113. The management service 120 can oversee the operation of the devices enrolled with the management service 120 as well as manage enrollment and un-enrollment operations for the devices. The management service 120 can provide functionality using application program interfaces (APIs). To this end, an API of the management service 120 can provide enrollment information regarding a device, such as whether the device is enrolled with the management service 120. APIs or API calls can be provided for other functionalities of the new management service 120 as discussed herein.

In some embodiments, an enterprise, such as one or more companies or other organizations, can operate the management service 120 to oversee or manage the operation of the client devices 109 of its employees, contractors, customers, students, or other users having user accounts with the enterprise. The enterprise can also operate the management service 120 to oversee or manage the operation of the gateways 111 associated with the enterprise, as well as devices that connect to the network 112 through the gateways 111, including IoT devices 113. An enterprise can be a customer of the management service 120. The management service 120 can remotely configure the client device 109 by interacting with an agent application, a management application 139 or another application 136 executed on the client device 109. Likewise, the management service 120 can remotely configure the gateway 111 by interacting with an agent application, gateway management application 159, or another application executed on the gateway 111. The gateway management application 159 can include a number of components including an IoT Agent for management and communication with IoT devices 113.

The management service 120 can transmit various software components to the gateway 111 which are then installed, configured, or implemented by the gateway management application 159. Such software components can include, for example, additional client applications, resources, libraries, drivers, device configurations, or other similar components that require installation on the gateway 111 as specified by the enterprise or an administrator of the management service 120. The management service 120 can further cause policies to be implemented on a gateway 111. Policies can include, for example, restrictions or permissions pertaining to capabilities of a gateway 111. For instance, policies can require certain hardware or software functions of the gateway 111 to be enabled or be disabled during a certain time period or based on a particular location. Such policies can be implemented by the gateway management application 159. The management service 120 can also cause the gateway 111 to activate or enroll IoT devices 113, for example, by placing at least one command associated with an activation schedule for one or more of the IoT devices in a command queue of the gateway 111. The gateway 111 can check in with the management service 120, retrieve the command from the command queue provided by the management service 120, and implement the command using the gateway management application 159.

Likewise, the management service 120 can transmit various software components to the client device 109 which are then installed, configured, or implemented by the management application 139. Such software components can include, for example, additional applications 136, resources, libraries, drivers, device configurations, or other similar components that require installation on the client device 109 as specified by an administrator of the management service 120. The management service 120 can further cause policies to be implemented on a client device 109. Policies can include, for example, restrictions or permissions pertaining to capabilities of a client device 109. For instance, policies can require certain hardware or software functions of the client device 109 to be enabled or be disabled during a certain time period or when the client device 109 is physically located at a particular location. Such policies can be implemented by the management application 139.

The management service 120 can also transmit various software components to the IoT device 113 which are then installed, configured, or implemented by the IoT management application 169. Such software components can include, for example, additional applications 166, resources, libraries, drivers, device configurations, or other similar components that require installation on the IoT device 113 as specified by an administrator of the management service 120. The management service 120 can further cause policies to be implemented on the IoT device 113. Policies can include, for example, restrictions or permissions pertaining to capabilities of an IoT device 113. For instance, policies can require certain hardware or software functions of the IoT device 113 to be enabled or be disabled during a certain time period or when the IoT device 113 is physically located at a particular location. Such policies can be implemented by the IoT management application 169. The management service 120 can transmit the software components to the IoT device 113 through the gateway 111. The management service 120 can have a command queue storing at least one action to perform on the particular gateway 111 upon check-in of the gateway 111. For instance, the gateway management application 159 can cause the gateway 111 to check-in with the management service 120, identify an action in the command queue, and perform or implement the action. An action can be the installation of a profile, or the execution of a command or other actions to install software components, implement policies, update the gateway management application 159, install a software product, or implement other commands. In some cases, the gateway management application 159 can cause a check-in of the gateway 111 periodically, on a schedule, or upon an event, such as changing a state of the gateway 111, installing an application on the gateway 111, upon detecting an IoT device 113, or upon receiving a request to access the network 112 or another request from an IoT device 113. In one example, the contents of the command queue can include a command that the gateway management application 159 cause to be executed on the gateway 111. In another example, the contents of the command queue can include a resource, an application, or an application update that the gateway management application 159 cause to be installed on the gateway 111, which the gateway can access through a specified uniform resource locator (URL) in the command. A client device 109 can likewise be associated with a command queue and can retrieve and implement commands.

The management service 120 can also request that the gateway 111 or client device 109 check-in using a notification service like APPLE® Push Notification Service (APNS), GOOGLE® Cloud Messaging (GCM), WINDOWS® Push Notification Services (WNS), or AirWatch® Cloud Messaging (AWCM). For example, the management service 120 can transmit a request to the notification service, which requests that the gateway 111 check-in with the management service 120. The notification service can push or otherwise route a notification to the gateway 111. Once the notification is received, the gateway management application 159 can cause the gateway 111 to check-in with the management service 120. The gateway management application 159 can determine whether a command queue provided by the management service 120 for the respective gateway 111 contains any commands or resources for the gateway 111, and, if so, can cause the commands or resources to be downloaded and/or implemented on the gateway 111. A client device 109 can likewise be associated with a command queue and can retrieve and implement commands in response to a request from a notification service.

An IoT Center of the management service 120 can oversee management of gateways 111, routers, routing switches, integrated access devices (IADs), multiplexers, a variety of metropolitan area network (MAN) and wide area network (WAN) access devices, and other edge devices. The management service 120 can also oversee management of IoT devices 113 that are connected through the edge devices. The management service 120 can generate and provide an administrative console or user interface for management of the gateway 111, other edge devices, and IoT devices 113 that are connected through the edge devices. The user interface of the Management service 120 can be accessed through management application 139 or another application 136 of a client device 109, or can be accessed through a network site provided by the Management service 120 or the management service 120. The Management service 120 can provide a user interface for setting and viewing alerts and notifications. The alerts and notifications can also be sent to a particular email address or to a particular client device 109.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system that can perform functionalities and execute applications. The operating system can be stored in a data store 133 that also includes client applications 136, a management application 139, an augmented reality application 149, an email application 145, a locker application 148, and other data. The client device 109 can execute the management application 139 to perform or access the functionality described for the management system 106.

The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine or a kiosk that is not easily portable.

The operating system of the client device 109 can be configured to execute various applications 136, such as a management application 139, a management application 139, an augmented reality application 149, an email application 145, a locker application 148, a browser application, or another application. The operating system and some applications 136 can access network content served up by the management system 106, or other servers, thereby rendering a user interface on a display, such as a liquid crystal display (LCD), organic light emitting diode (OLED) display, touch-screen display, or other type of display device.

To this end, some applications 136 can include a browser or a dedicated application, and a user interface can include a network page, an application screen, or other interface. The client device 109 can also access web applications using the browser application. Further, other applications 136 can include device management applications, enterprise applications, social networking applications, word processors, spreadsheet applications, media player applications, or other applications. The management application 139 can perform actions as directed by the management service 120, for instance, by checking in with the management service 120, retrieving a command from the command queue, and implementing the command as discussed above.

The augmented reality (AR) application 142 can operate in conjunction with a camera device of the client device 109. For example, the AR application 142 can render a user interface that includes images, video, and other image data in a view of the physical world that can update constantly or periodically on a display of the client device. The AR application 142 can also generate a managed object overlay or multiple managed object overlays on the image data. The managed object overlay can provide information about managed objects including devices, rooms, areas, and other managed objects in the physical environment that are currently being captured using the camera device and displayed in the user interface of the AR application 142. The managed object overlay can also include a user interface element that when selected causes an action associated with the managed object to be performed. The AR application 142 can include all or a subset of the action data 128, and can identify actions that can be performed by a user of the client device 109. For example, the user can log in to the client device 109, the AR application 142, or another application 136 on the client device 109. The AR application 142 can identify the user account and can determine user-specific actions that can be performed in connection with the managed objects displayed in the user interface of the AR application 142 based on the action data 128. The AR application 142 can also consider device data 125 associated with the client device 109, characteristics and status of the managed objects displayed in the user interface, and other information in order to determine an action that can be performed in connection with the managed objects displayed in the user interface of the AR application 142.

The AR Application 142 can determine which managed objects are displayed in the user interface of the AR application 142, or are in a field of view of the client device 109. In some cases, the AR application 142 can utilize a location of the client device 109 and an orientation of the client device 109 in order to determine that a managed object is in a field of view of the client device 109. The location of the client device 109 can be determined using a GPS device, a network device or WiFi device, or a combination of techniques. The orientation of the client device 109 can be determined using accelerometer, gyroscope, magnetometer, and other devices of the client device 109. An azimuthal angle can be determined for the client device 109. An azimuthal angle can include a measurement in a coordinate system such as a spherical coordinate system, horizontal coordinate system, or another coordinate system. The orientation of the client device 109 can be calculated using a vector that indicates a direction the client device 109 or a camera of the client device 109 is pointing. The azimuthal angle can be an angle between the vector or a horizontal component of the vector and a horizontal reference vector in a horizontal. Azimuthal angle can indicate a horizontal angle at which the client device is pointing in the horizontal plane with reference to the horizontal reference vector. In some cases, the orientation of the client device 109 can also calculate an elevation angle or altitude angle of the client device 109. The elevation angle can be an angle between the vector and the horizontal plane. The elevation angle can indicate an angle at which the client device 109 is pointing up or down vertically with reference to the horizontal plane.

The AR application 142 can also communicate with the management service 120 in order to determine managed objects that are in the field of view of the camera of the client device 109. In some cases, the AR application 142 can transmit the location and orientation of the client device 109 to the management service, and the management service 120 can identify a managed object or device in the field of view of the client device 109. The management service 120 can transmit the identity of the managed object or device to the AR application 142. AR application 142 can receive the managed object or device, and can determine actions that are available for the managed object or device that is identified. In some cases, the management service 120 can determine actions that are available for the managed object or device that is identified, and the AR application 142 can receive the actions that are available from the management service 120.

The AR application 142 can transmit data that identifies an action to be performed to the management service 120, and the management service 120 can determine commands to be executed by the client device 109 or a managed device such as an IoT device 113. The management service 120 can place the commands to perform the action in a command queue of the client device 109, and/or place the commands to perform the action in a command queue of the managed object. The client device 109 and managed device can retrieve and execute the commands to perform the action.

The gateway 111 can be representative of one or more gateways 111. While referred to as a gateway, the gateway 111 can also be representative of routing switches, integrated access devices (IADs), multiplexers, a variety of metropolitan area network (MAN) and wide area network (WAN) access devices, and other edge devices. The gateway 111 can execute gateway management application 159 and other applications 156 and modules stored in the data store 153. The gateway management application 159 can perform management functionalities including enrollment functionalities, product and application installations, and profile installations. These functionalities can include a number of modules or components that perform actions through the gateway 111, and the gateway management instructions can be updated, upgraded, or otherwise altered throughout the lifecycle of the gateway 111. The gateway 111 can provide network 112 access to the IoT devices 113, as well as implement enrollment processes and gathering IoT metrics data based on IoT device 113 communications with the gateway 111.

The gateway management application 159 can be an agent, an application, or other instructions executable by the gateway 111. The gateway management application 159 can facilitate communications between the gateway 111 and the management service 120 and can implement actions on the gateway 111. The actions can be retrieved from a command queue of the management service 120. To this end, the gateway management application 159 can communicate with the management service 120, for example, through an enrollment endpoint of the management service 120 or an address associated with the management service 120.

The IoT device 113 can be representative of one or more IoT devices 113. The IoT device 113 can include appliances, vehicles, sensors, controllers, actuators, monitors, phones, tablets, thermostats, speakers, printers, locks, and other devices and can incorporate processor-based systems that can include a processor, network communication hardware, and a memory including executable instructions, such as a computer system or any other device with like capability. The IoT device 113 can have an operating system or other software that can perform functionalities and execute applications. The operating system can be stored in a data store 163 that also includes applications 166, an IoT management application 169, and other data. The IoT device 113 can execute the IoT management application 169 to perform or access the functionality described for the management system 106, including the management service 120, the management service 120, and the Management service 120.

The IoT device 113 can also be equipped with networking capability or networking interfaces, including a localized networking or communication capability, such as a near-field communication (NFC) capability, radio-frequency identification (RFID) read or write capability, or other localized communication capability. In some embodiments, the IoT device 113 is mobile where the IoT device 113 is easily portable from one location to another. In other situations, the IoT device 113 can be a thermostat, fixture, or other device that is not easily portable.

The IoT management application 169 can perform actions as directed by the management service 120 and/or the gateway 111. The gateway management application 159 and/or the management service 120 can maintain a command queue for the IoT device 113. The command queue for the IoT device 113 can include actions and commands as discussed. The gateway management application 159 can determine whether states exist on the IoT device 113 that violate one or more of the compliance rules 127 based on status data received from the IoT device 113, or pass status data received from the IoT device 113 to the management service 120 to perform the evaluation. If the IoT device 113 is not in compliance, the gateway management application 159 or the management service 120 can place a command to bring the IoT device 113 into compliance in a command queue for the IoT device 113. The IoT management application 169 can retrieve the command to bring the IoT device 113 into compliance. The IoT management application 169 can implement the command. The management service 120 can place a command for the IoT device 113 in the command queue for the gateway 111. The gateway management application 159 can retrieve the command and place it in a command queue for the IoT device 113 that is maintained on the gateway 111.

Figure 2:
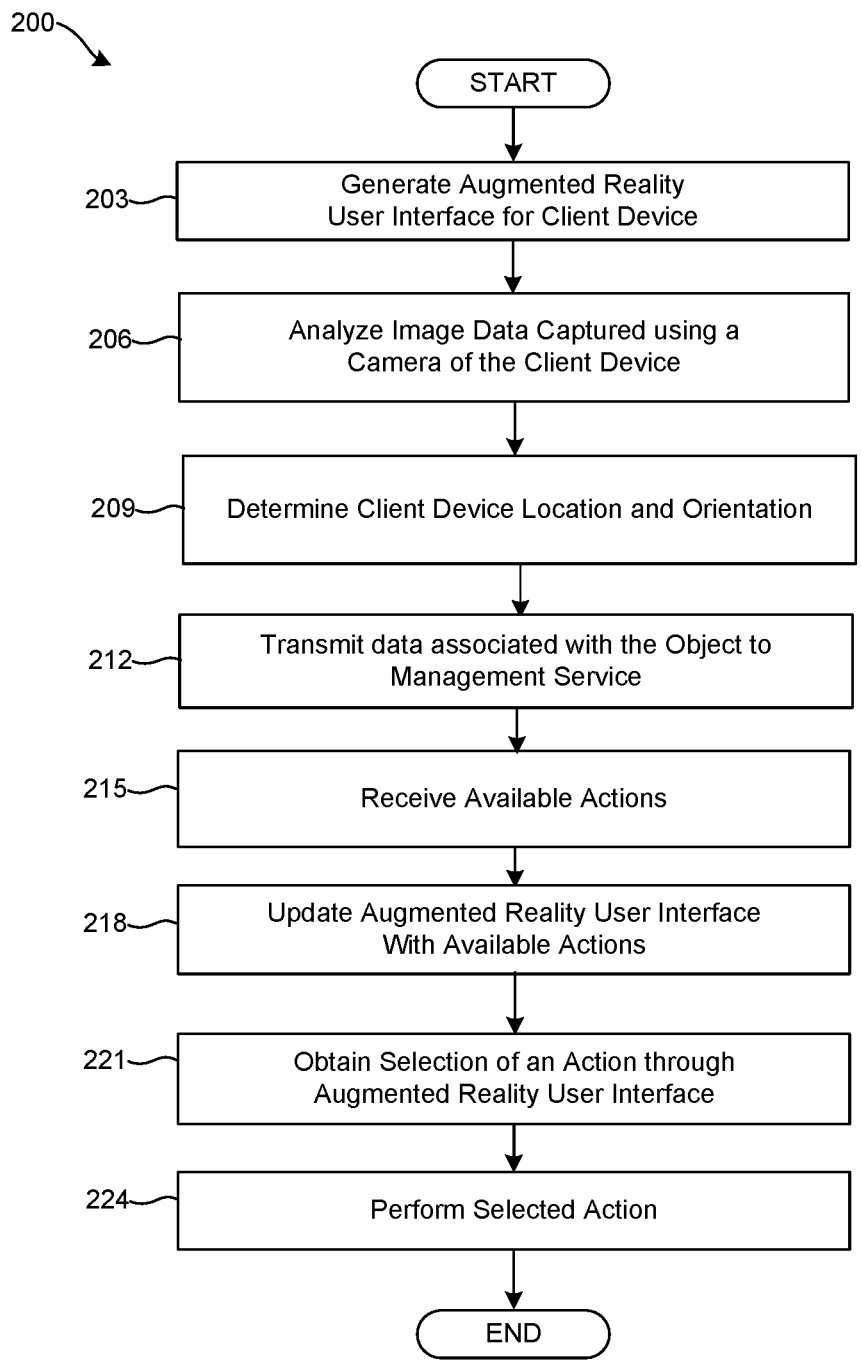
FIG. 2 is a flowchart illustrating functionality implemented by components of the networked environment.

FIG. 2 shows a flowchart 200 that illustrates functionality performed by components of the networked environment 100. Generally, this enables the client device 109 to perform actions associated with managed objects in a field of view of the client device 109 executing the AR application 142.

In step 203, the AR application 142 can generate an AR user interface for display on the client device 109. The AR application 142 can cause a camera device of the client device 109 to capture image data that is periodically or constantly updated, and display the image data on the display of the client device 109. The AR application 142 can also generate managed object overlay on a view of the physical world that includes the image data. In some cases the managed object overlay can include information about the enterprise environment in the field of view of the client device 109. The information can include information about managed objects, including areas, rooms, and devices within the field of view of the client device 109 that are managed by the management service 120.

In step 206, the AR application 142 can analyze image data currently being captured using the camera of the client device 109. The AR application 142 can perform image analysis to determine that there is an object in the field of view of the camera of the client device 109, and/or determine object data about the object. In some cases, the image analysis can include optical character recognition (OCR) of an image to determine object data associated with the object. For example, a name of a room can be posted on a sign near a room. The client device 109 can be pointed towards the sign, and the AR application 142 can perform OCR on image data currently captured by a camera device of the client device 109 and identify characters that indicate the name of the room. In some situations, the AR application 142 can transmit the image data to the management service 120. The management service 120 can perform OCR to identify the name of the room or other object data. Image analysis can also include recognizing machine readable identifiers that are captured in the field of view of the camera of the client device 109. A machine-readable identifier can include a QR code, a bar code, or another type of identifier. The machine-readable identifier can include encoded information about the object, or can include an encoded link, URL, or network address that includes the information about the object. The information encoded or linked to by the machine-readable identifier can include the name of the room or other object data. In some situations, the AR application 142 can transmit the image data to the management service 120. The management service 120 can identify the machine-readable identifier from the image data to identify the name of the room or other object data.

The AR application 142 can also use image analysis coupled with machine learning models to determine that there is an object in the field of view of the camera of the client device 109, and/or determine object data about the object. For example, the AR application 142 can capture image data using the client device 109 to recognize that the image data includes an object that is classified as a particular type or classification based on an image classification model. In some cases, the target object can be identified as a particular managed object or device, and in other cases a type of the object can be identified. A confidence score can also be provided that specifies an confidence with which the particular managed object, or the type of object is identified. A managed object can be an object associated with an account of the management service 120, or an object for which the management service 120 as a number of actions stored in the action data 128. Each managed object or device can be associated with an object type. In some situations, for example, where the client device 109 has insufficient hardware to perform the image analysis, the AR application 142 can transmit the image data to the management service 120. The management service 120 can perform image analysis using the image classification model as described for the AR application 142. In some cases, multiple objects can be identified in the field of view of the camera, and the AR application 142 can generate object data for each respective object.

In step 209, the AR application 142 can analyze the location and orientation of the client device 109. The location of the client device 109 can be determined using a GPS device, a WiFi device or other network device, or a combination of techniques. The orientation of the client device 109 can be determined using an azimuthal angle of the client device 109. The AR application 142 can determine an orientation vector that indicates a direction the client device 109 or a camera of the client device 109 is pointing. The AR application 142 can determine the azimuthal angle as an angle between the orientation vector and a horizontal reference vector in a horizontal plane. In some cases, an elevation angle or altitude angle of the client device 109 can be calculated using the orientation vector. The elevation angle can be an angle between the orientation vector and the horizontal plane. The elevation angle can indicate an angle at which the client device 109 is pointing up or down vertically. The AR application 142 can determine position data that can include the location and orientation of the client device 109 and associate or include it with the object data for the object.

In step 212, the AR application 142 can transmit data associated with the object in the field of view of the client device 109, or object data, to the management service 120. The object data can include a character string identified using OCR, a machine-readable identifier, image data that includes an image of the object, a classification (and confidence score) for the object, and position data for the client device 109. In some examples, transmitting the object data can be considered a request for available actions. The management service 120 can receive the object data and can identify actions that are available for the client device 109. In some cases, the AR application 142 can authenticate with the management service 120 using account credentials that can include one or more of a username, a password, an HMAC token, a certificate, or other authentication data. This authentication data can also be included in the request for available actions transmitted to the management service. In some cases, the request for available actions can include an identifier or type of the client device 109, an identifier of the user account, an identifier of a user group, and/or other information associated with the client device 109.

In step 215, the AR application 142 can receive available actions or role-based actions from the management service 120. The management service 120 can receive the object data and identify a managed object based on the object data. The management service 120 can use the location of the client device 109 and the orientation of the client device 109, which can include the azimuthal angle and elevation angle, to identify a managed object or managed objects that are in front of the client device 109. The location and orientation of the client device 109 can be compared to locations of managed objects in the action data 128 to identify one or more managed object that is in a viewing angle of the client device 109. For example, the managed objects can be determined to be within a predetermined area defined in relation to the orientation vector of the client device 109. In some cases, the object data includes a character string identified using OCR, a machine-readable identifier, image data that includes an image of the object, or a classification (and confidence score) for the object. The management service 120 can also compare this object data to the managed objects in the action data 128 to identify a particular managed object.

The management service 120 can identify a list of actions associated with the managed object. The list can include actions that are available for the client device 109, and additional actions that are not available for the client device 109, and predefined rules within the action data 128 that specify available actions based on role and/or predetermined rules. The management service 120 can determine available actions for the client device 109 based on the authentication data and the list of actions for the managed object. The available actions can be considered role-based actions. A role can be determined using the authentication data. The authentication data can be associated with an identifier or type of the client device 109, a particular user account, a user group associated with a user account, compliance status of the client device 109 based on compliance rules 127, and/or other information associated with the client device 109. Each action in the list of actions for a managed object can be associated with a respective role and/or the predetermined rules. The management service 120 can determine the available or role-based actions for the managed object and transmit the actions to the client device 109. The management service 120 can also transmit an identity or identifier of the managed object to the client device 109, which can be referred to as a managed object identifier.

In step 218, the AR application 142 can update the AR user interface with the available actions. For example, the AR application 142 can generate a managed object overlay associated with the managed object, and overlay it on the view of the physical world that includes the image data captured by the client device 109. In some cases, managed object overlay includes information associated with the managed object. The managed object overlay can also include a user interface element or action element that, when selected by a user, causes an action associated with the managed object to be performed. The AR application 142 can determine a position of the managed object overlay based on a detected position of the managed object in the AR user interface. Where the AR user interface detects more than one managed object, a position of a respective managed object overlay associated with a respective managed object is determined. To avoid user confusion as to which managed object overlay corresponds to a particular managed object, the AR application 142 can prevent a managed object overlay for the particular managed object from being displayed in an area of the user interface that includes or is occupied by another managed object. The managed object overlay for the particular managed object can also be displayed to intersect with an area of the user interface that includes or is occupied by the particular object, or be displayed within a predetermined distance from the area occupied by the particular object. In some cases, the managed object overlay for a particular managed object can be displayed contained within an area of the user interface that includes or is occupied by the particular object.

In step 221, the AR application 142 can obtain a selection of an action through the AR user interface. For example, a user can select a user interface element or action element of a managed object overlay. In some cases, a single managed object overlay can include multiple action elements that can be selected by a user. In other cases, a selection of a user interface element of a managed object overlay can cause multiple actions to be displayed along with a respective description of a respective action and a user interface element that when selected causes the respective action to be performed.

In step 224, the AR application 142 can perform a selected action, or cause a selected action to be performed. In some examples, a printer can be a managed object in the field of view of the client device 109 and the available action can be a print action or a schedule maintenance action. A role associated with the client device 109 can be an employee role that is permitted to print to the printer, for example, based on a user group or other factors as discussed. Alternatively, the client device 109 can be associated with an administrative role, or a role that allows the client device 109 to perform a schedule maintenance action. Performing specific actions associated with a printer sis discussed further with reference to FIGS. 3A and 3B.

Figure 3A:
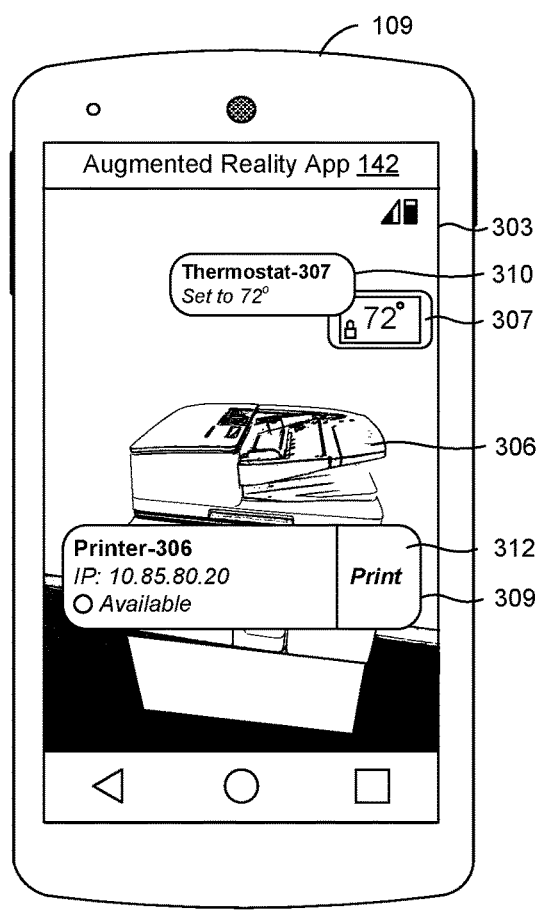

FIG. 3A illustrates a user interface 303 of the AR application 142 rendered on a display of a client device 109. An enterprise environment can include managed objects including a printer 306 and a thermostat 307. The printer 306 and thermostat 307 can be managed objects or devices such as IoT devices 113. The user interface 303 can generate an overlay 309 for the printer 306 and an overlay 310 for the thermostat 307. The AR application 142 can use image analysis coupled with image classification models to determine that there are multiple objects in the field of view of the client device 109. The AR application 142 can use an image classification model to identify that a first object in the field of view of the client device 109 is a printer. The AR application 142 can also use an image classification model to identify that a second object in the field of view of the client device 109 is a thermostat. The AR application 142 can transmit object data to the management service 120 that identifies that a first object is a printer and a second object is a thermostat. The AR application 142 can also determine a location and orientation of the client device 109 and transmit this position data to the management service 120 along with the object data.

The management service 120 can determine that the printer 306 matches the object data and position data. For example, the printer 306 can be a printer within a predetermined area based on the location and orientation of the client device 109. The management service 120 can also determine that the thermostat 307 matches the object data and position data. For example, the thermostat 307 can be a thermostat within a predetermined area based on the location and orientation of the client device 109. The management service 120 can transmit the identity of the printer 306 and the thermostat 307 to the client device 109, along with information and available actions for these managed objects. The management service 120 can determine available actions for the client device 109 based on authentication data and the list of actions for the managed object. The management service 120 can determine that the client device 109, or a user of the client device 109, has access to print to the printer 306, but does not have access to change thermostat settings for the thermostat 307. As a result, the management service 120 can transmit information for the thermostat 307 that includes temperature settings, but no available actions for the thermostat 307. The management service 120 can transmit information and available actions for the printer 306, including a print action.

The AR application 142 can update the user interface to generate the overlay 310 to include the temperature settings and the identity of the thermostat 307. The AR application 142 can update the user interface to generate the overlay 309 to include the identity of the printer 306, information including an IP address and availability or another status of the printer 306. The overlay 309 can also include a user interface element that when selected enables the client device 109 to print to the printer 306. The AR application 142 can prevent the overlay 309 from being displayed in an area of the user interface 303 that includes or is occupied by the thermostat 307, or another object other than the printer 306. Likewise, the AR application 142 can prevent the overlay 310 from being displayed in an area of the user interface 303 that includes or is occupied by the printer 306, or another object other than the thermostat 307.

The AR application 142 can provide the client device 109 or a client application 136 with access to the printer to perform the print action. In order to provide access or ability to print to the printer, the AR application 142 can install an application, driver, or policy associated with the printer to the client device 109. In some cases, the AR application 142 can transmit the selected action to the management service 120, and the management service 120 can place requirements to perform the action in a command queue for the client device 109. The AR application 142 or management application 139 can check in with the management service 120, and retrieve a command from a command queue for the client device 109, and the command can cause the client device 109 to install the application, driver, or policy associated with the printer to the client device 109. The AR application 142 can also receive an address or other information required to print to the printer. The AR application 142 can print to the printer by transmitting a document to a print queue of the printer. In other cases the AR application 142 can open and/or transfer control to a client application 136 such as an email application 145 or a content locker application 148 to allow the client application to print to the printer. In some cases, the AR application 142 can transmit printing data that includes the document and the identity of the printer to the management service 120, and the management service 120 can place a command to print the document in a command queue of the printer that is maintained by the management service 120. The printer can execute the command to print the document.

Figure 3B:
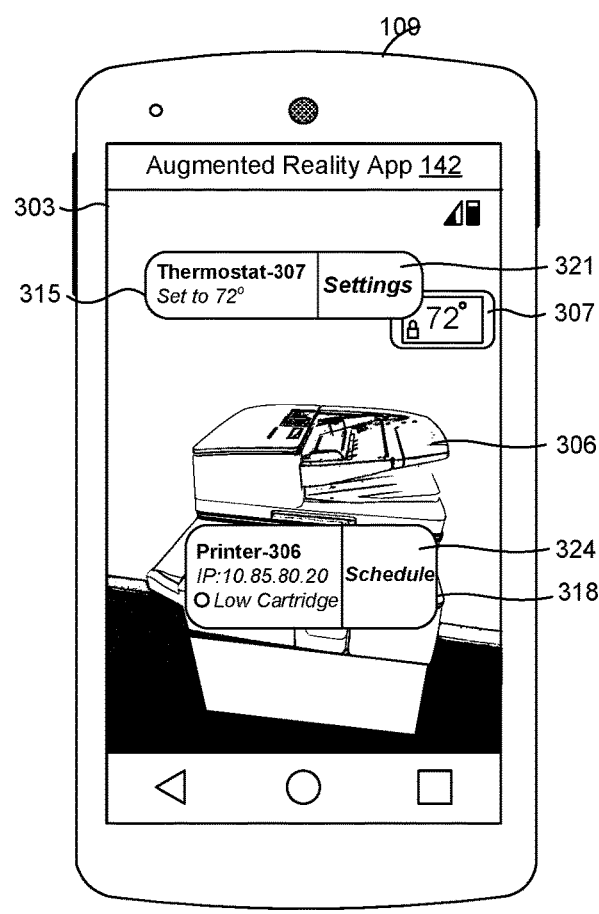

FIG. 3B illustrates a user interface 303 of the AR application 142 rendered on a display of a client device 109. Much like FIG. 3A, the AR application 142 can use an image classification model to identify that a first object in the field of view of the client device 109 is a printer and a second object is a thermostat. In this situation, the user of the client device 109 can be associated with an administrative role, or can otherwise have access to actions related to printer maintenance and thermostat settings. A role associated with the client device 109 can be an administrator role that is permitted to change thermostat settings, for example, based on a user group or other factors. The AR application 142 can transmit object data to the management service 120 that identifies that the first object is a printer and the second object is a thermostat. The AR application 142 can also determine a location and orientation of the client device 109 and transmit this position data to the management service 120 along with the object data. The AR application 142 can also authenticate with the management service 120 using account credentials that can include one or more of a username, a password, a token, a certificate, or other authentication data.

The management service 120 can determine that respective ones of the printer 306 and the thermostat 307 match both the object data and position data. The management service 120 can transmit the identity of the printer 306 and the thermostat 307 to the client device 109, along with information and available actions for these managed objects. The management service 120 can determine available actions for the client device 109 based on authentication data and the list of actions for the managed object. The management service 120 can determine that the client device 109, or a user of the client device 109, has access to actions related to printer maintenance of the printer 306 and thermostat settings for the thermostat 307. As a result, the management service 120 can transmit information for the thermostat 307 that includes current temperature settings, as well as available actions for the thermostat 307 including a change settings action.

The AR application 142 can update the user interface to generate the overlay 315 to include the identity of the thermostat 307, the current temperature, and available actions for the thermostat 307. The overlay 315 can also include a user interface element 321 that when selected causes the AR application 142 to perform a change thermostat settings action. The AR application 142 can perform the change thermostat settings action by transmitting a request to change the thermostat settings to the management service 120. In some cases the AR application 142 can provide a user interface element that allows a user to enter a temperature, a power setting such as on or off, or a another setting such as cooling, heating, or automatic.

The management service 120 can transmit information for the printer 306 including a low cartridge status or other maintenance status, and available actions for the printer 306, including a schedule maintenance action. The AR application 142 can update the user interface to generate the overlay 318 to include the identity of the printer 306, information including an IP address and cartridge status of the printer 306. The overlay 318 can also include a user interface element 324 that when selected enables the client device 109 to schedule printer maintenance for the printer 306. The AR application 142 can prevent the overlay 318 from being displayed in an area of the user interface 303 that includes or is occupied by the thermostat 307, or another object other than the printer 306. In addition, the AR application 142 can determine a position of the overlay 318 to display it contained within an area of the user interface 303 that includes or is occupied by the printer 306. The AR application 142 can determine the area that includes or is occupied by the printer 306, and a respective area for each object detected in the field of view of the client device 109.

A user can select the user interface element 324, and the AR application 142 can perform the selected maintenance action by scheduling maintenance for the printer. Because the printer is a managed object and data associated with the printer is available through the AR application 142 or the management service 120, the AR application 142 can automatically fill out a maintenance ticket using data associated with the printer, and submit the maintenance ticket to the management service 120 to schedule maintenance for the printer. In some cases, the AR application 142 can open a client application 136 and fill the maintenance ticket in the client application 136.

Figure 4A:
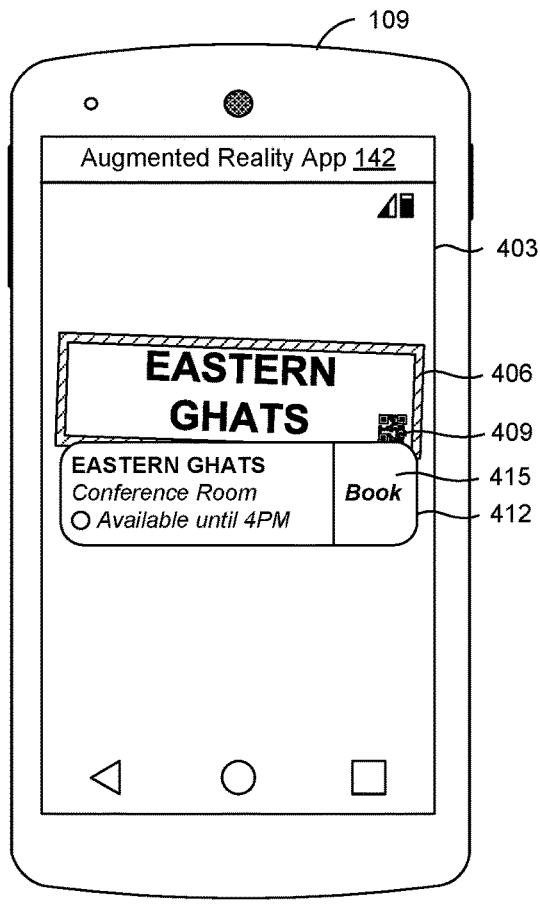

FIG. 4A illustrates a user interface 403 of the AR application 142 rendered on a display of a client device 109. An enterprise environment can include managed objects including a conference room, or another type of room, and a sign 406 associated with the room. The room can be a managed object that is managed by the management service 120, for which a list of actions are stored in the action data 128. The user interface 403 can generate an overlay 412 for the room. The AR application 142 can use image analysis such as OCR and/or identification of machine-readable identifiers to determine object data about the room. For example, the AR application 142 can perform OCR on image data captured by a camera of the client device 109, and identify the character string "EASTERN GHATS" from the sign 406. Additionally or alternatively, the AR application 142 can scan to identify machine-readable identifier 409. The machine-readable identifier 409 can include encoded information about the room, or can include an encoded link, URL, or network address that includes the information about the room. The information encoded or linked to by the machine-readable identifier 409 can include the name of the room, for example "EASTERN GHATS," and other data about the room including availability information.

The AR application 142 can transmit object data to the management service 120 that includes the character string "EASTERN GHATS," an image of the machine-readable identifier 409, or other data from the machine-readable identifier 409. The AR application 142 can also determine a location and orientation of the client device 109 and transmit this position data to the management service 120 along with the object data.

The management service 120 can determine that the room "EASTERN GHATS" matches the object data and position data. For example, the room "EASTERN GHATS" can be a room within a predetermined area based on the location and orientation of the client device 109. The management service 120 can also determine that room "EASTERN GHATS" matches the object data and position data. The management service 120 can determine available actions for the client device 109 based on authentication data and the list of actions for the room "EASTERN GHATS." The management service 120 can determine that the client device 109, or a user of the client device 109, has access to book the room. As a result, the management service 120 can transmit information for the room "EASTERN GHATS" that includes availability from a present time until a nearest time the room is booked. The management service 120 can transmit available actions for the room, including a room reservation action.

The AR application 142 can update the user interface 403 to generate the overlay 412 to include the identity of the room such as "EASTERN GHATS," a type of room such as "Conference Room," and availability information like "Available until 4 PM," as shown. The overlay 412 can also include a user interface element 415, that when selected enables the client device 109 to reserve the room. The AR application 142 can perform the selected room reservation action by scheduling a room reservation for the EASTERN GHATS room. Because the room is a managed object and data associated with the room is available through the AR application 142 or the management service 120, the AR application 142 can automatically fill out a room reservation form using data associated with the room and/or the client device 109, and submit the room reservation form to the management service 120 to reserve the room. In some cases, the AR application 142 can open a client application 136 like the email application 145 and fill the room reservation form in the application with information about the room and the user of the client device 109.

Figure 4B:
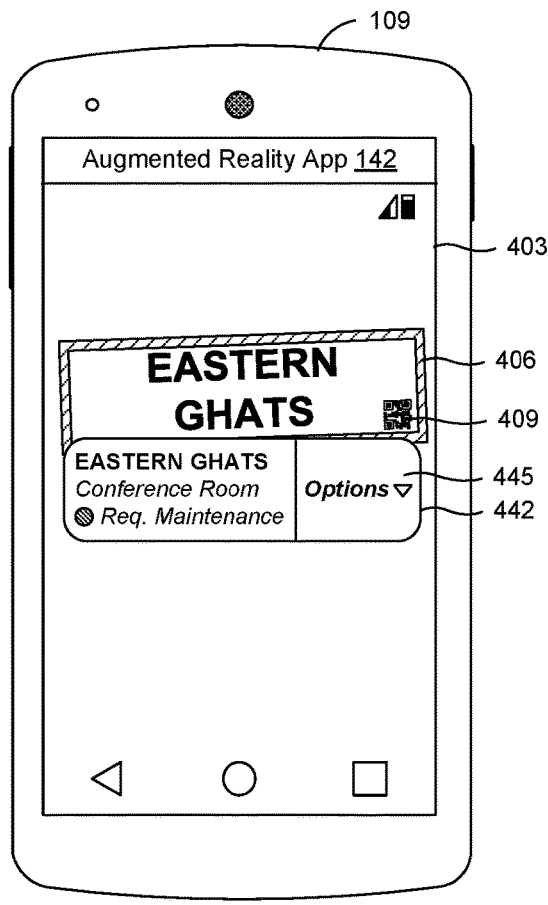

FIG. 4B illustrates a user interface 403 of the AR application 142 rendered on a display of a client device 109. FIG. 4B is much like FIG. 4A, but a role associated with the client device 109 can be an administrative role, an available action can be a room maintenance actions. The management service 120 can determine the available actions for the client device 109 based on authentication data and the list of actions for the EASTERN GHATS room. The management service 120 can transmit available actions for the room, including a room maintenance options or actions. The AR application 142 can update the user interface 403 to generate the overlay 442 to include the identity of the room such as "EASTERN GHATS," a type of room such as "Conference Room," and maintenance status information like "Req. Maintenance," as shown. The overlay 442 can also include a user interface element 445, that when selected provides a list of available maintenance actions associated with the EASTERN GHATS room. In some cases, the AR application 142 can perform a selected room maintenance action by scheduling maintenance for the room. The AR application 142 can automatically fill out a maintenance form or ticket using data associated with the room, and submit the maintenance form to the management service 120 to schedule maintenance for the room. In some cases, the AR application 142 can open a client application 136 and fill the maintenance form in the client application 136.

Figure 4C:
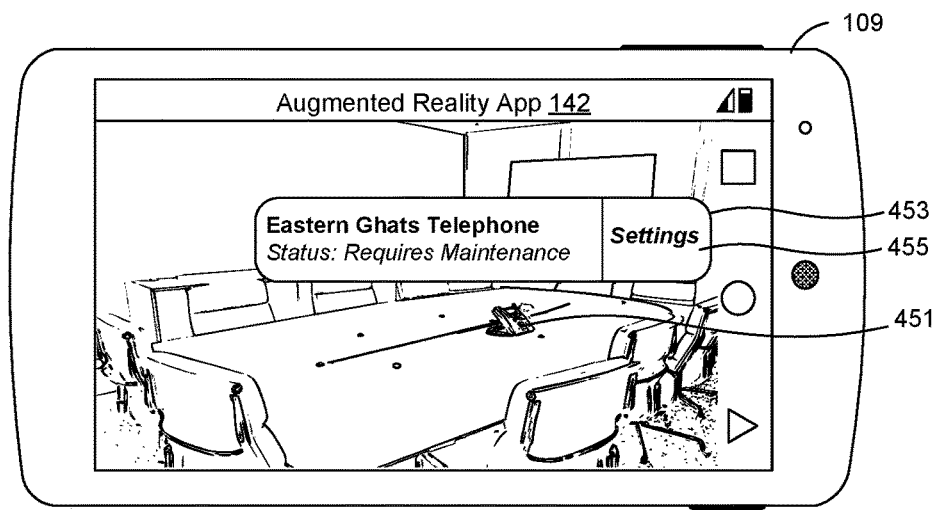

FIG. 4C illustrates a user interface 403 of the AR application 142 rendered on a display of a client device 109. The user interface 403 shows a field of view of the client device 109 that includes an interior of the EASTERN GHATS room, including a telephone 451. The user interface 403 also includes an overlay 453, that includes a user interface element 455 "Settings," that when selected causes settings for the telephone 451 to be displayed. While the room itself can be a managed object, the room can also be associated with other managed objects like the telephone 451. The telephone 451 can be difficult to manage or apply settings through the user interface of the telephone 451 itself. Accordingly, in some cases the AR application 142 can be utilized to provide a user-friendly interface to access certain settings of managed objects including the telephone 451.

FIG. 5A illustrates a user interface 503 of the AR application 142 rendered on a display of a client device 109. An enterprise environment can include a conference room and a sign 506 associated with the room. The room can be a managed object that is managed by the management service 120, for which a list of actions are stored in the action data 128. The AR application 142 can use image analysis such as OCR to determine object data about the room. For example, the AR application 142 can perform OCR on image data captured by a camera of the client device 109, and identify the character string "PIEDMONT" from the sign 406. Other techniques can be utilized, such as image recognition models that indicate the image data includes a door or a room. The AR application 142 can transmit the location and orientation of the client device 109 can be transmitted alone, and the management service 120 can identify that the room using location and orientation of the client device 109 alone, or in combination with the image recognition model or the character string "PIEDMONT." The management service 120 can transmit available actions for the room, including a room maintenance options or actions, to the client device 109. AR application 142 can generate an overlay 509 for the room, including an identity such as "PIEDMONT," a type of room such as "Conference Room," and a reservation status from a present time until a time the room is available, such as "Booked until 2 PM." The overlay 509 can also include a user interface element 512 that when selected displays a list of actions or options for the room. The list of actions can be determined using a role of the user of the client device 109. In some cases, a list of additional information can be opened in a client application 136, or the AR application 142.

FIG. 5B illustrates a user interface 523 of the client application 136 rendered on a display of a client device 109. In some cases, the AR application 142 can open a client application 136 that shows additional information about a managed object. The user interface 523 includes additional information about the PIEDMONT room. The name of the room, an email address for the room, a number of seats in the room, a list of equipment for the room, and a reservation status of the room can be shown in the user interface 523 of the client application 136, or in the AR application 142.

FIG. 5C illustrates a user interface 543 of the client application 136 rendered on a display of a client device 109. In some examples, the client application 136 can be an email application 145 or another application. The AR application 142 can be performing a selected action by scheduling event for the room using the client application 136. Because the room is a managed object and data associated with the room is available through the AR application 142 or the management service 120, the AR application 142 can automatically fill out an event form in the user interface 543 of the client application 136 using data associated with the room and/or the client device 109, and submit the event form to the management service 120 to schedule the event. For example, the AR application 142 can automatically fill out the email address of the user of the client device 109 such as "name@company.com" based on an email address associated with authentication data. The AR application 142 can automatically fill out an email address or other identifier of the room such as "CR.Piedmont@company.com," based on an email address associated with the PIEDMONT room within action data 128 or other data of the management service 120. In some cases, additional information can be left for a user to enter, such as an event name, notes, and status markers such as "Busy" and "Private" status markers.

Figure 6A:
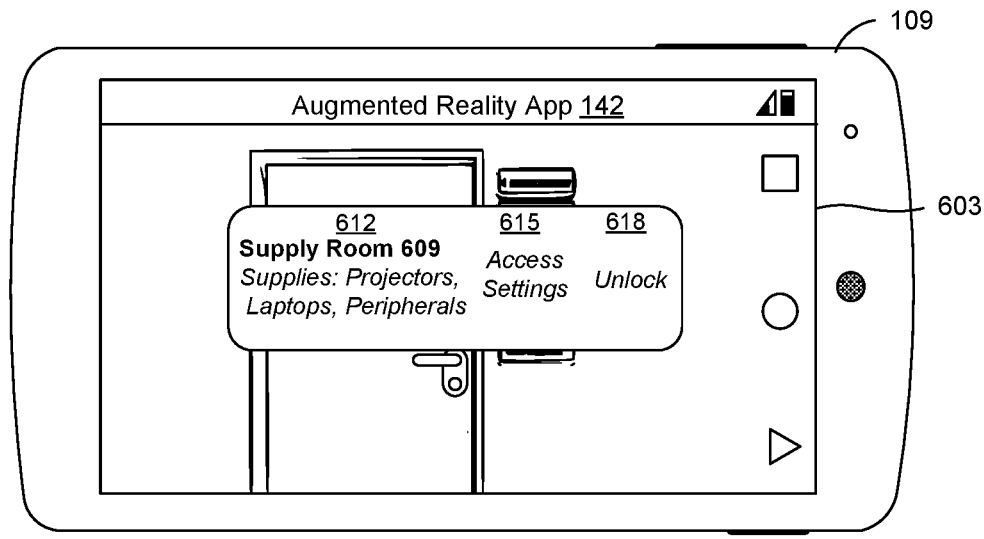

FIG. 6A illustrates a user interface 603 of the AR application 142 rendered on a display of a client device 109. The client device 109 can be associated with a user account that has access to a supply room 609 that has a door with an electronic lock IoT device 113, and the available action for the supply room 609 can be a door unlock action. The user interface 603 can include an overlay 612 that includes an identity of the supply room 609, and a list of supplies stored in the supply room 609. The overlay 612 can also include a user interface element 615 that provides access settings for the supply room 609, such as which users or groups of users are permitted access to the supply room 609. The overlay 612 can also include a user interface element 618 that when selected causes an unlock action to be performed. The AR application 142 can transmit a request to unlock the door of the supply room 609 to the management service 120. The management service 120 can perform the selected action by transmitting an unlock command to an electronic lock IoT device 113 associated with the room, or place an unlock command in a command queue of the electronic lock IoT device 113. The electronic lock IoT device 113 can retrieve the command and unlock the door.

Figure 6B:
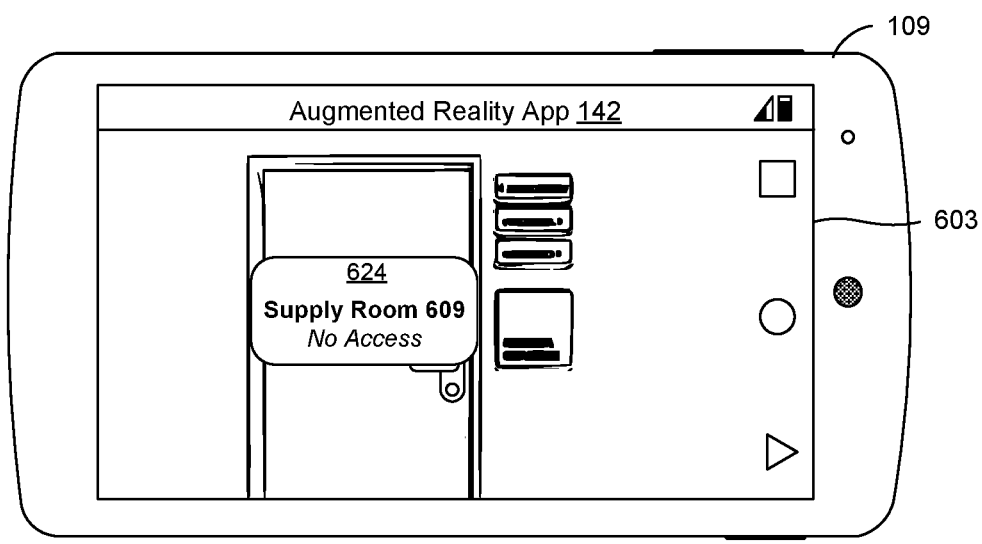

FIG. 6B illustrates a user interface 603 of the AR application 142 rendered on a display of a client device 109. The client device 109 can be associated with a user account that is not permitted access to the supply room 609 with the electronic lock IoT device 113, and no available actions that the client device 109 can perform respecting the supply room 609. The user interface 603 can include an overlay 624 that includes an identity of the supply room 609, and a user-specific message or status such as "No Access."

The IoT devices 113, gateways 111, client devices 109, and devices including the management system 106 can include at least one processor circuit, for example, having a processor and at least one memory device, both of which couple to a local interface, respectively. The device can include, for example, at least one computer, a mobile device, smartphone, computing device, server device, or like device. The local interface can include, for example, a data bus with an accompanying address/control bus or other bus structure.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The IoT devices 113, gateways 111, client devices 109, and devices including the management system 106 can include a display upon which user interfaces can be rendered. The IoT devices 113, gateways 111, client devices 109, and devices including the management system 106 can also include one or more input/output devices that can include, for example, a capacitive touchscreen or other type of touch input device, fingerprint reader, or keyboard.

Although the management service 120, gateway management application 159, gateway management application 159, and other various services and functions described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for performing actions using augmented reality, the system comprising:
    a client device; and
    a data store comprising instructions executable by the client device, the instructions, when executed, causing the client device to:
        generate a user interface comprising a field of view currently captured by a camera of the client device;
        transmit, to a management service, a request for at least one group-role-specific action for a managed object within the field of view of the camera, the managed object being identified based on a machine-readable identifier in the field of view of the camera, the at least one group-role-specific action comprising an action that is specific to a group role corresponding to a user group specified in a user account with the management service, and wherein the user account associated with the client device is identified by the management service based on an HMAC token transmitted with the request;
        receive, from the management service, a group-role-specific action for the managed object, the group-role-specific action being identified from a list of actions for the managed object in the field of view of the camera, based on the group role corresponding to the user group specified in the user account with the management service;
        update the user interface to include a managed object overlay, the managed object overlay comprising a user interface element that causes the group-role-specific action to be performed; and
        perform the group-role-specific action based on a selection of the group-role-specific action for the managed object.

2. The system of claim 1, wherein the request for the at least one group-role-specific action further comprises authentication data associated with the client device.

3. The system of claim 2, wherein the group role is associated with the authentication data for the user account with the management service.

4. The system of claim 1, wherein the group-role-specific action is performed by a subset of the instructions, and wherein the subset of the instructions, when executed, cause the client device to:
    transmit data identifying the group-role-specific action to the management service;
    retrieve a command that is placed in a command queue by the management service; and
    execute the command in the client device.

5. The system of claim 4, wherein the command is a command to install at least one of: a driver for the managed object, an application associated with the managed object, or a profile associated with the managed object.

6. The system of claim 4, wherein the group-role-specific action is performed by a subset of the instructions, wherein the subset of the instructions, when executed, cause the client device to transmit data identifying the group-role-specific action to the management service, and wherein the management service places a command to perform the group-role-specific action in a command queue of the managed object.

7. The system of claim 1, wherein the instructions, when executed, further cause the client device to:
    determine an area that includes the managed object within the field of view of the user interface; and
    position the managed object overlay based on the area that includes the managed object.

8. A non-transitory computer-readable medium embodying instructions executable by a client device, wherein the instructions, when executed, cause the client device to:
    generate a user interface comprising a field of view currently captured by a camera of the client device;
    transmit, to a management service, a request for at least one group-role-specific action for a managed object within the field of view of the camera, the managed object being identified based on a machine-readable identifier in the field of view of the camera, the at least one group-role-specific action comprising an action that is specific to a group role specified in a user account with the management service, and wherein the user account associated with the client device is identified by the management service based on an HMAC token transmitted with the request;
    receive, from the management service, a group-role-specific action for the managed object, the group-role-specific action being identified from a list of actions for the managed object in the field of view of the camera, based on the group role corresponding to a user group specified in the user account with the management service;
    update the user interface to include a managed object overlay, the managed object overlay comprising a user interface element that causes the group-role-specific action to be performed; and
    perform the group-role-specific action based on a selection of the group-role-specific action for the managed object.

9. The non-transitory computer-readable medium of claim 8, wherein the request for the at least one group-role-specific action further comprises authentication data associated with the client device.

10. The non-transitory computer-readable medium of claim 9, wherein the group role is associated with the authentication data within the management service.

11. The non-transitory computer-readable medium of claim 8, wherein the group-role-specific action is performed by a subset of the instructions, and wherein the subset of the instructions, when executed, cause the client device to:
    transmit data identifying the group-role-specific action to the management service;
    retrieve a command that is placed in a command queue by the management service; and
    execute the command in the client device.

12. The non-transitory computer-readable medium of claim 11, wherein the command is a command to install at least one of: a driver for the managed object, an application associated with the managed object, or a profile associated with the managed object.

13. The non-transitory computer-readable medium of claim 8, wherein the instructions, when executed, further cause the client device to:

determine an area that includes the managed object within the field of view of the user interface; and position the managed object overlay based on the area that includes the managed object.

14. A computer-implemented method comprising:

generating a user interface comprising a field of view currently captured by a camera of a client device;

transmitting, to a management service, a request for at least one group-role-specific action for a managed object within the field of view of the camera, the managed object being identified based on a machine-readable identifier in the field of view of the camera, the at least one group-role-specific action comprising an action that is specific to a group role specified in a user account with the management service, and wherein the user account associated with the client device is identified by the management service based on an HMAC token transmitted with the request;

receiving, from the management service, a group-role-specific action for the managed object, the group-role-specific action being identified from a list of actions for the managed object in the field of view of the camera, based on the group role corresponding to a user group specified in the user account with the management service;

updating the user interface to include a managed object overlay, the managed object overlay comprising a user interface element that causes the group-role-specific action to be performed; and performing the group-role-specific action based on a selection of the group-role-specific action for the managed object.

15. The computer-implemented method of claim 14, wherein the request for the at least one group-role-specific action further comprises authentication data associated with the client device.

16. The computer-implemented method of claim 15, wherein the group role is associated with the authentication data within the management service.

17. The computer-implemented method of claim 14, wherein the group-role-specific action is performed by:

transmitting data identifying the group-role-specific action to the management service;

retrieving a command that is placed in a command queue by the management service; and executing the command in the client device.

18. The computer-implemented method of claim 17, wherein the command is a command to install at least one of: a driver for the managed object, an application associated with the managed object, or a profile associated with the managed object.

19. The computer-implemented method of claim 14, wherein the group-role-specific action is performed by transmitting data identifying the group-role-specific action to the management service, and wherein the management service places a command to perform the group-role-specific action in a command queue of the managed object.

20. The computer-implemented method of claim 14, wherein the group-role-specific action comprises an option or a setting for the managed object.

* * * * *